Sept. 8, 1931. H. W. JOHNSON 1,822,295
SALES SLIP PAD HOLDER
Filed Sept. 27, 1930
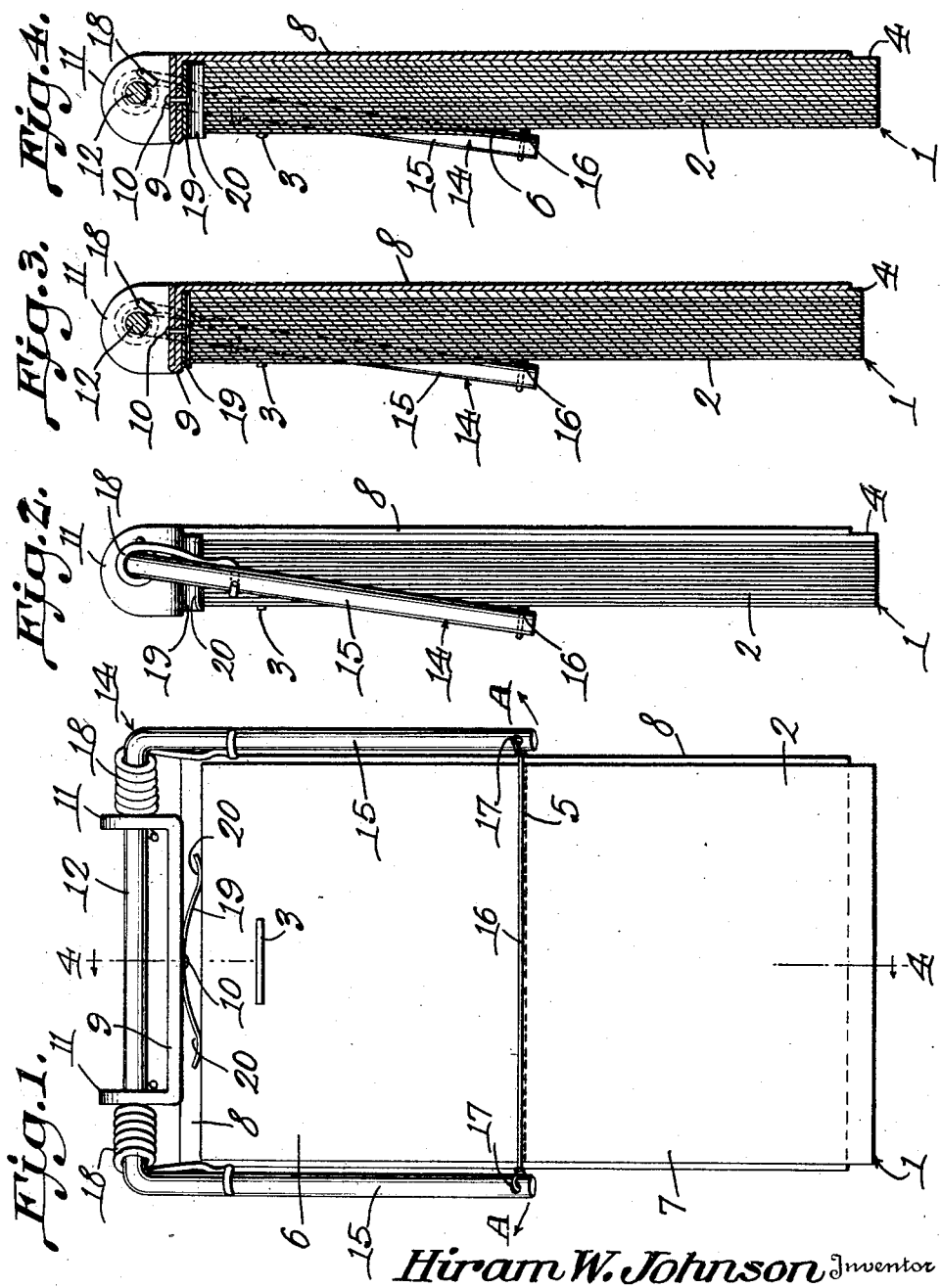
Hiram W. Johnson Inventor
By C. A. Snow & Co.
Attorneys Patented Sept. 8, 1931

1,822,295

UNITED STATES PATENT OFFICE

HIRAM W. JOHNSON, OF MIAMI, FLORIDA

SALES SLIP PAD HOLDER

Application filed September 27, 1930. Serial No. 484,873.

This invention aims to provide novel means for holding a pad of paper whilst parts of the leaves of the pad are being torn off.

A mechanic who works within the scope of what is claimed, can make changes in the form shown, without departing from the spirit of the invention.

Figure 1 is a front elevation;

Figure 2 is a side elevation;

Figure 3 is a section on the line 4—4 of Figure 1 showing the parts as they will appear after a slip has been torn off, the pad having been shoved upwardly by the operator, to permit the severing member to ride downwardly onto a new leaf;

Figure 4 is a section on the line 4—4 of Figure 1 showing the device as it will appear after the pad has been shoved downwardly by the action of the spring, to permit the severing member to move upwardly under the stub or coupon that still remains attached to the pad.

The numeral 1 marks a pad made of leaves 2 fastened together at 3 upon a stiff back 4, the leaves being perforated transversely at 5 to form an upper coupon 6 and a lower detachable coupon 7. The upper coupon 6 is retained by the merchant, and the lower coupon 7 is given to the purchaser, although what is done with the coupons is purely a matter of business procedure. It is with such a pad, or with a similar pad, that the device forming the subject matter of this application is adapted to be used.

The structure shown, described and claimed, embodies a base 8, preferably a metal plate that is a little shorter than the pad 1, the pad, in any event, extending downwardly somewhat below the lower edge of the base 8, as shown in Figure 1, so that the pad can be manipulated conveniently, as hereinafter described.

On its upper edge, the base 8 has a forwardly presented bracket 9 which may consist of a flange folded back on itself for reenforcement, the constituent walls of the bracket 9 being held together by a securing element 10, such as a rivet. At its ends, the bracket 9 has upstanding ears 11.

In the ears 11 of the bracket 9, the cross bar 12 of a rectangular grip 14 is mounted to turn. The cross bar 12 of the grip 14 has side arms 15, which are resilient, and tend to spread apart in the direction of the arrows A. This tendency in the arms 15 tightens a severing member 16 which is connected to the lower ends of the arms 15. The severing member 16 may be a piece of fine flexible wire, secured in holes 17 formed in the lower ends of the arms 15, or attached to the arms otherwise.

Coiled springs 18 are engaged around the cross bar 12 between the arms 15 of the grip 14 and the ears 11. The springs 18 are engaged with the ears 11 and with the side arms 15. The primary function of the springs 18 is to swing the grip 14 toward the base 8, thereby keeping the severing member 16 tightly pressed against the pad 1, but the springs 18 have another purpose, in that, being interposed between the ears 11 and the arms 15, they prevent the grip 14 from shifting sidewise, that is in the direction of the length of the cross bar 12. A bowed spring 19 is attached by the securing element 10 to the bracket 9, and has curved ends 20 that bear on the upper edge of the pad 1.

The operator tears off the lower coupon 7 along the severing member 16. The operator shoves up the pad 1, to the position of Figure 3, against the action of the spring 19, and the severing member 16 slides off the coupon 6, and upon the next whole leaf of the pad. The upward pressure on the lower end of the pad 1, longitudinally of the base 8, is relieved, and the spring 19 forces the pad downwardly into the position of Figure 4, with the severing member 16 on top of the next whole leaf 2 and under the coupon 6 from which the coupon 7 has been severed, the device then being in position to have another coupon 7 torn off.

Having thus described the invention, what is claimed is:

1. A device of the class described, comprising a base, a pad grip carried by the base, and including a sheet-severing means, spring means for operating the pad grip to cause the severing member to move toward the base, and means carried by the base for returning a pad to its normal position upon being moved transversely of the severing means.

2. A device of the class described, comprising a base, a pad grip carried by the base and including a sheet-severing means, spring means for operating the pad grip to cause the severing means to move toward the base, and means carried by the base for returning a pad to its normal position upon being moved transversely of the severing means.

3. A device of the class described, comprising a base, a pad grip carried by the base and comprising arms, a flexible sheet-severing means extended between the arms, the arms being resilient and tending to separate, thereby to tighten the severing means, spring means for operating the pad grip to cause the severing means to move toward the base, and means carried by the base for returning a pad to its normal position upon being moved transversely of the severing means.

4. A device of the class described, comprising a base having a bracket, a pad grip mounted to turn in the bracket and including a sheet-severing means, spring means for operating the pad grip to cause the severing means to move toward the base, and means mounted on the bracket for returning a pad to its normal position upon being moved transversely of the severing means.

5. A device of the class described comprising a base, the base being provided with a bracket, a pad grip mounted to move in the bracket and including a sheet-severing means, spring means for operating the pad grip to cause the severing means to move toward the base, and a spring carried by the bracket and so located as to engage a pad on the base and return the pad to its normal position upon being moved transversely of the severing means.

In testimony that I claim the foregoing as my own, I have hereto affixed my signature.

HIRAM W. JOHNSON.